US012786271B2

(12) United States Patent
Ran et al.

(10) Patent No.: US 12,786,271 B2
(45) Date of Patent: Nov. 3, 2026

(54) MULTI-SATELLITE COLLABORATIVE DYNAMIC MICRO CLOUD BUILDING METHOD AND DISTRIBUTED MICRO CLOUD SYSTEM

(71) Applicant: National Innovation Institute of Defense Technology, Beijing (CN)

(72) Inventors: Dechao Ran, Beijing (CN); Peng Wu, Beijing (CN); Wanting Qin, Beijing (CN); Lu Cao, Beijing (CN); Fei Zhang, Beijing (CN); Mingjiang Ji, Beijing (CN); Xianbin Li, Beijing (CN)

(73) Assignee: NATIONAL INNOVATION INSTITUTE OF DEFENSE TECHNOLOGY, Beijing (CN)

( * ) Notice: Subject to any disclaimer, the term of this patent is extended or adjusted under 35 U.S.C. 154(b) by 41 days.

(21) Appl. No.: 19/001,215

(22) Filed: Dec. 24, 2024

(65) Prior Publication Data

US 2026/0181042 A1 Jun. 25, 2026

(30) Foreign Application Priority Data

Nov. 7, 2023 (CN) ........................ 202311466765.X

(51) Int. Cl.
*H04L 67/104* (2022.01)
*G06F 9/48* (2006.01)

(52) U.S. Cl.
CPC .......... *H04L 67/1044* (2013.01); *G06F 9/485* (2013.01)

(58) Field of Classification Search
CPC ............... H04L 67/1044; H04L 12/185; G06F 11/1425; G06F 9/485; G06F 9/4881
See application file for complete search history.

(56) References Cited

U.S. PATENT DOCUMENTS

| | | | | |
|---|---|---|---|---|
| 6,522,636 | B1 * | 2/2003 | Hogberg | H04B 7/18519 455/12.1 |
| 2022/0279052 | A1 * | 9/2022 | Amacker | H04L 67/60 |
| 2024/0062658 | A1 * | 2/2024 | Ucar | G08G 1/20 |
| 2024/0253827 | A1 * | 8/2024 | Guiney | G06F 3/0484 |

* cited by examiner

*Primary Examiner* — Frantz B Jean
(74) *Attorney, Agent, or Firm* — Yuhao Liang

(57) ABSTRACT

Disclosed are a multi-satellite collaborative dynamic micro cloud building method and a distributed micro cloud system. The method includes steps: triggering to build an initial state of a micro cloud satellite group according to a task instruction; after a satellite node closest to a task center receives the task instruction, each satellite node will perform matching analysis according to its position and existing resource conditions; beginning task planning and task execution after the satellite nodes join a micro cloud to provide on-orbit service support; and the micro cloud is a dynamic distributed system, and the satellite nodes join or exit the micro cloud according to service windows and task execution. The multi-satellite collaborative dynamic micro cloud building method and the distributed micro cloud system can provide more reliable and efficient satellite communication services.

9 Claims, 4 Drawing Sheets

MULTI-SATELLITE COLLABORATIVE DYNAMIC MICRO CLOUD BUILDING METHOD AND DISTRIBUTED MICRO CLOUD SYSTEM

CROSS REFERENCE TO RELATED APPLICATIONS

The present application claims the priority of Chinese patent application No. 202311466765.X, filed on Nov. 7, 2023, and contents of which are incorporated herein by reference.

FIELD OF THE INVENTION

The present invention relates to the field of satellite communication and edge computing, in particular to a multi-satellite collaborative dynamic micro cloud building method and a distributed micro cloud system for providing more reliable and efficient satellite communication services.

BACKGROUND OF THE INVENTION

Sensing, communication, processing, and storage loads can be carried on satellites. Virtual characterization and autonomous collaboration of resources can be utilized to form rich resource pools, so as to provide a reliable space-based computing support for ground networks. Existing technologies closest to the present invention include the following [1]-[3]:

[1] A dynamic inter-satellite multi-satellite collaborative computing method and system, a device, and a medium, including: obtaining auxiliary satellite data in a satellite network and computing task data to be computed, and building a satellite quintuple and a task quadruple according to the auxiliary satellite data and the computing task data, where the satellite quintuple includes satellite IDs, starting of a satellite visible time window, ending of the satellite visible time window, the visible time window, and computing speed of satellites, and the task quadruple includes computing task IDs, starting time of computing tasks, ending time of the computing tasks, and a data size of the computing tasks; computing, according to the satellite quintuple, the task quadruple, and a preset objective function, an optional scheduling strategy about minimum total energy consumption required for executing the computing tasks or minimum total time required for executing the computing tasks; and distributing the computing tasks to corresponding auxiliary satellites according to the optimal scheduling strategy, thereby achieving multi-satellite collaborative computing in a dynamic time-varying environment.

[2] A task offloading and computing resource alposition method and system for a low orbit satellite network. To describe heterogeneous service computing requirements in a future low orbit satellite network, a task offloading model is built according to a fusion edge cloud and cloud edge low orbit satellite computing model and two types of service requirements; an objective function is built according to time delay cost, energy consumption cost, and cost of funds paid to a computing platform, to obtain an optimization problem; the optimization problem is molded as a non-cooperative game, and the existence of equilibrium in the game is proved by building a potential function; and the equilibrium is obtained by using a hybrid particle swarm optimization algorithm and obtaining an analytical solution, and an optimal strategy combining offloading decision-making and computing resource allocation is ultimately obtained. The invention considers a low orbit satellite edge computing architecture integrating an edge cloud and a cloud edge for two types of services, solves the problem of task heterogeneity in an actual edge computing scenario, maximizes resource utilization, and reduces terminal overhead to a greater extent.

[3] A satellite cloud computing system and method. The satellite cloud computing system includes: a main control node module, configured to arrange and schedule running, monitoring, control, information processing, communication, and on-board micro cloud services of the satellite cloud computing system; at least one computing node module, configured to deploy and run containers, provide on-board micro cloud services, and compute; a storage module, configured to store data of the satellite cloud computing system; a switching module, configured to switch between the main control node module, the plurality of computing node modules, and the storage module; and a power supply module, configured to supply power to the main control node module, the plurality of computing node modules, the storage module, and the switching module. The invention achieves flexible allocation of on-board computing resources, load balancing, and multi-task parallel execution, and significantly improves the stability of on-board high-performance computing and data processing and transmission performance.

The above existing technologies [1]-[3] achieve multi-satellite collaborative computing by means of providing a task scheduling strategy, building a computing offloading model, designing a satellite cloud computing system, etc. However, the existing technologies, which focus on the scheduling and offloading of computing tasks for a single satellite, will face the problems of short satellite resources, low offloading algorithm applicability, etc. There is still room for improvement on the solution of intelligent computing of satellites.

SUMMARY OF THE INVENTION

In response to the problems in the existing technologies, the present invention aims to provide a multi-satellite collaborative dynamic micro cloud building method, which achieves intelligent computing of edge satellites and autonomy between edge satellites by building a micro cloud satellite group on satellites and allocating tasks to each satellite node in a micro cloud. This method can alleviate computational pressure on ground clouds, improve the efficiency and reliability of intelligent computing of satellites, and bring more technological innovation and application prospects to the field of satellite communication.

To achieve the above objective, the present invention provides a multi-satellite collaborative dynamic micro cloud building method. The method includes the following steps:

step S101: triggering to build an initial state of a micro cloud satellite group according to a task instruction; setting a satellite node closest to a task center as a main node, wherein after the main node receives the task instruction, each surrounding satellite node will perform matching analysis according to its position and existing resource conditions, and if the current position of a satellite node meets requirements and carried resources also meet requirements, the satellite node joins the micro cloud satellite group;

step S102: beginning task planning and task execution after the satellite nodes join a micro cloud, so as to provide on-orbit service support, wherein each node joins the micro cloud within a service window, and exits the micro cloud after crossing a mission area service window; and step S103: the micro cloud is a dynamic distributed system, and the satellite nodes join or exit the micro cloud according to service windows and task execution.

Further, in step S101, parameters from a satellite node to the main node include: relative distance, CPU computing cores c, and storage resources s; the instruction issued by the task center includes two parts: required computing cores C and storage resources S; because the computing content of each task is different and satellites constantly move, a customized micro cloud needs to be built for different tasks;

distances between the main node of the micro cloud and the surrounding satellites are sequentially sorted, and the CPU computing cores c and storage resources s of the satellites are traversed; until the computing cores and storage resources required for tasks meet requirements, building of the micro cloud is completed; building formulas are as follows:

$$\sum_{i=1}^{I} x_{i,j} c_i \geq C$$

$$\sum_{i=1}^{I} x_{i,j} s_i \geq S$$

wherein $x_{i,j}$ represents whether the satellites $i \in I$ belong to the micro cloud $j \in J$, $c_i$ represents CPU computing cores of the satellites $i \in I$, and $s_i$ represents storage resources of the satellites $i \in I$.

Further, step S101 of building an initial state of a micro cloud satellite group includes the following steps:

step S201: the main node publishes a notification of joining the cloud to each satellite node in the micro cloud with the current task as a topic through a distributed publish and subscribe mechanism;

step S202: other satellite nodes in the micro cloud subscribe a notification of newly joining satellite nodes through tasks as topics, store the notification locally in respective satellite nodes, and can publish handshake information to the newly joining satellite nodes;

step S203: a new satellite node subscribes the handshake information of the other satellite nodes after publishing a notification of joining the micro cloud; and step S204: in order to ensure management on each satellite node in the micro cloud, a heartbeat mechanism is added to the management on the micro cloud to periodically monitor whether each satellite node is on line.

Further, in step S201, the notification of joining the cloud includes satellite node ID, various resource conditions, and load conditions.

Further, in step S202, the publishing of the handshake information may be unified by a satellite node in the micro cloud, or each satellite node may publish the handshake information separately.

Further, in step S204, the monitoring period of the heartbeat mechanism is 30 seconds.

Further, step S102 of providing on-orbit service support is as follows:

step S301: each node in the micro cloud plans and evaluates the current task according to the task instruction and its on-orbit physical resources, scores the degree of task matching according to the evaluation result, and shares the score in the micro cloud;

step S302: each node in the micro cloud sorts score data, selects a task according to the priority order, and reports the undertaken task; and step S303: each node in the micro cloud schedules various load resources according to task allocation, shares load pre-processing data, and processes the same or different load data according to the data shared by other nodes.

Further, step S103 of micro cloud node update is as follows:

step S401: the satellite nodes constantly move and provide task service windows within a coverage area;

step S402: determining whether the allocated task is completed or exits the satellite service window, and whether to exit the micro cloud;

step S403: if an exit condition is satisfied, applying to other nodes in the micro cloud for exiting and proceeding to a task migration and relay handover step; handing over the task according to the role of the node, and stopping task execution; and step S404: sending a notification of exiting the cloud to other nodes in the micro cloud, logging out and releasing resources, and exiting the micro cloud.

On the other hand, the present invention provides a distributed micro cloud system. The system is implemented according to the multi-satellite collaborative dynamic micro cloud building method described in the present invention. In the system, a micro cloud satellite group connects devices of different galaxies, and integrates storage and computing resources of the devices together.

Further, the micro cloud system is dynamically built according to the state and available resource information of satellite nodes in a micro cloud, and the configuration of the micro cloud system can be adaptively adjusted.

Beneficial effects of the present invention are as follows:

1. Communication between different satellites, including data transmission, control signal transmission, etc., can be stable.
2. The micro cloud satellite group connects devices of different galaxies, and integrates storage and computing resources of the devices together to form a distributed micro cloud system.
3. The micro cloud system is dynamically built according to the state and available resource information of micro cloud nodes, and the configuration of the micro cloud system can be adaptively adjusted.

DETAILED DESCRIPTION OF THE EMBODIMENTS

The technical solutions of the present invention will be clearly and completely described below with reference to the accompanying drawings. Apparently, the described embodiments are some of, not all of, the embodiments of the present invention. Based on the embodiments in the present invention, all other embodiments obtained by those of ordinary skill in the art without any creative efforts shall fall within the scope of protection of the present invention.

In the description of the present invention, it should be noted that the orientations or positional relationships indicated by the terms "center", "upper", "lower", "left", "right", "vertical" "horizontal", "inner", "outer", etc. are based on the orientations or positional relationships shown in the accompanying drawings, are only intended to facilitate the description of the present invention and simplify the description, and are not intended to indicate or imply that a device or element referred to must have a particular orientation or be constructed and operated in a particular orientation, and therefore, the terms cannot be understood as limiting the present invention. Furthermore, the terms "first", "second", and "third" are only for the sake of description, and cannot be understood as indicating or implying the relative importance.

In the description of the present invention, it should be noted that, unless otherwise specified and defined, the terms "mounted", "connected", and "connection" should be generally understood, for example, the "connection" may be fixed connection, detachable connection, integral connection, mechanical connection, electrical connection, direct connection, connection by a medium, or internal communication between two elements. For those of ordinary skill in the art, the specific meanings of the terms in the present invention may be understood according to specific situations.

Specific implementations of the present invention will be described in detail below in conjunction with FIG. 1 to FIG. 4. It should be understood that the specific implementations described here are only intended to illustrate and explain the present invention and are not intended to limit the present invention.

Figure 1:
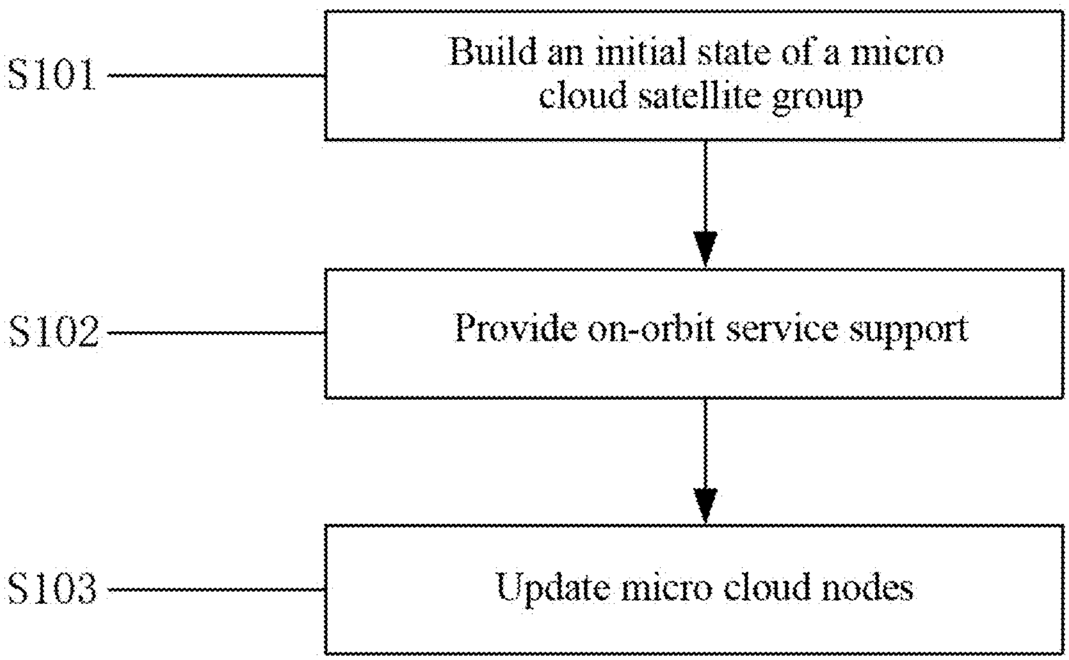
FIG. 1 illustrates a flowchart of a multi-satellite collaborative dynamic micro cloud building method according to the present invention.

The high-speed movement of satellites and the diversity of tasks lead to a dynamic change process in building of a micro cloud. The present invention provides a multi-satellite collaborative dynamic micro cloud building method, communication, and data transmission, which can be divided into three parts: satellite nodes joining a micro cloud, providing micro cloud computing services, and satellite nodes exiting the micro cloud. As shown in FIG. 1, a multi-satellite collaborative dynamic micro cloud building method according to the present invention includes the following steps:

Step S101: Trigger to build an initial state of a micro cloud satellite group according to a task instruction. After a satellite node closest to a task center (considered as a main node of a micro cloud) receives the task instruction, each surrounding satellite node will perform matching analysis according to its position and existing resource conditions. If the current position of a satellite node meets requirements and carried resources also meet requirements, the satellite node joins the micro cloud satellite group.

Parameters from a satellite node to the main node include: relative distance l, CPU computing cores c, and storage resources s; and the instruction issued by the task center includes two parts: required computing cores C and storage resources S. Because the computing content of each task is different and satellites constantly move, a customized micro cloud needs to be built for different tasks.

Matching analysis: distances between the main node of the micro cloud and the surrounding satellites (defined as visible for communication) are sequentially sorted, and the CPU computing cores $c_i$ and storage resources $s_i$ of the satellites $i \in I$ are traversed. Until the computing cores and storage resources required for tasks meet requirements, building of the micro cloud is completed. That is, $$\sum_{i=1}^{I} x_{i,j} c_i \geq C$$

$$\sum_{i=1}^{I} x_{i,j} s_i \geq S$$

Herein, $x_{i,j}$ represents whether the satellites $i \in I$ belong to the micro cloud $j \in J$, $c_i$ represents CPU computing cores of the satellites $i \in I$, and $s_i$ represents storage resources of the satellites $i \in I$.

Example: The instruction issued by the task center includes image target recognition and a processing task, which require the building of a micro cloud to provide satellite computing resources. The task requires 8 CPU computing cores and 20 G storage resources. The satellite receiving the task triggers a micro cloud building instruction, and the satellite is considered as a central node of the micro cloud. At this time, satellite distances between other surrounding satellites and the central node are exported according to the connection relationship of a satellite network and sorted, and resources of the satellites at current time are read, as shown in Table 1.

TABLE 1

Satellite resource statistics at current time

| Serial number | Satellite ID | CPU computing cores | Storage resources (G) |
|---|---|---|---|
| 1 | 32 | 2 | 5 |
| 2 | 34 | 4 | 6 |
| 3 | 54 | 2 | 8 |
| 4 | 43 | 2 | 8 |
| 5 | 24 | 4 | 3 |
| ... | ... | ... | ... |

According to the sorting order, computing cores and storage resources are summed separately until task requirements are met (as shown in Table 1, satellite IDs 32, 34, 54, and 43 are selected to build a micro cloud required for the task).

Step S102: Begin task planning and task execution after the satellite nodes join a micro cloud, so as to provide on-orbit service support. Each node joins the micro cloud within a service window, and exits the micro cloud after crossing a mission area service window. Therefore, from the perspective of a single satellite node, service provision is an intermittent process, but from the perspective of the overall micro cloud, service provision is a continuous process. Task planning, service generation, and service provision in the micro cloud are a continuous planning, relay, and iterative process.

Step S103: The micro cloud is a dynamic distributed system, and the satellite nodes join or exit the micro cloud according to service windows and task execution.

Figure 2:
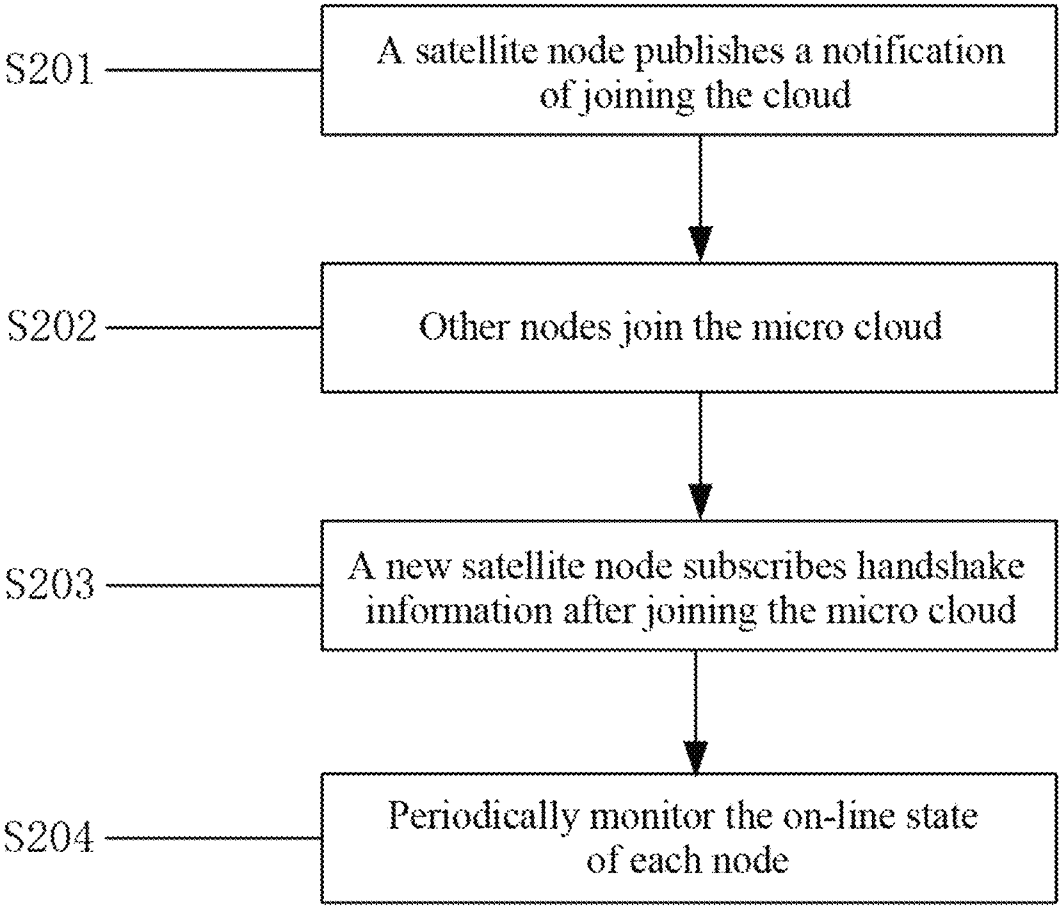
FIG. 2 illustrates a schematic diagram of a process of updating a micro cloud satellite group in the multi-satellite collaborative dynamic micro cloud building method according to the present invention.

Specifically, as shown in FIG. 2, step S101 of building an initial state of a micro cloud satellite group is detailed as follows (S201-S204):

Step S201: The satellite node (main node) publishes a notification of joining the cloud to each satellite node in the micro cloud with the current task as a topic through a distributed publish/subscribe mechanism. The topic of the inbound notification may be defined according to the task content, and the message contains satellite node ID and various resources (CPU computing resources and memory resources).

Step S202: Other satellite nodes in the micro cloud subscribe a notification of newly joining satellite nodes through tasks as topics, store the notification locally in respective satellite nodes, and can publish handshake information to the newly joining satellite nodes. The publishing of the handshake information may be unified by a node in the micro cloud, or each node may publish the handshake information separately.

Step S203: A new satellite node subscribes the handshake information of the other satellite nodes after publishing a notification of joining the micro cloud. If the handshake information is not received within a specific time, it is necessary to consider whether a single satellite node builds the cloud or that sending of the notification of joining the micro cloud fails or is abnormal.

A single satellite node builds the cloud: an independent satellite node builds the micro cloud, rather than a plurality of satellite nodes join the micro cloud. In this case, the other satellite nodes cannot receive the handshake information.

The abnormal situations are handled by the following ways:

(1) Timeout handling: set a reasonable time window within which to wait for the arrival of the handshake information. If the handshake information is not received within the time window, it can be considered that an abnormal situation occurs.

(2) Error handling: perform corresponding error handling according to the specific abnormal situation. For example, if the communication problem is caused by a network fault, the handshake information can be re-sent or the network connection can be retried. If it is a node fault or software problem, troubleshooting and repair may be required.

(3) Logging and monitoring: add appropriate logging and monitoring mechanisms to the system to track and analyze the occurrence of abnormal situations. By monitoring logs and system states, problems can be better recognized and solved.

(4) Alarm mechanism: in case of abnormal situations, an alarm mechanism can be triggered to notify operation and maintenance personnel to handle.

Step S204: In order to ensure management on each satellite node in the micro cloud, a heartbeat mechanism can be added to the management on the micro cloud to monitor whether each satellite node is on line every 30 seconds.

Figure 3:
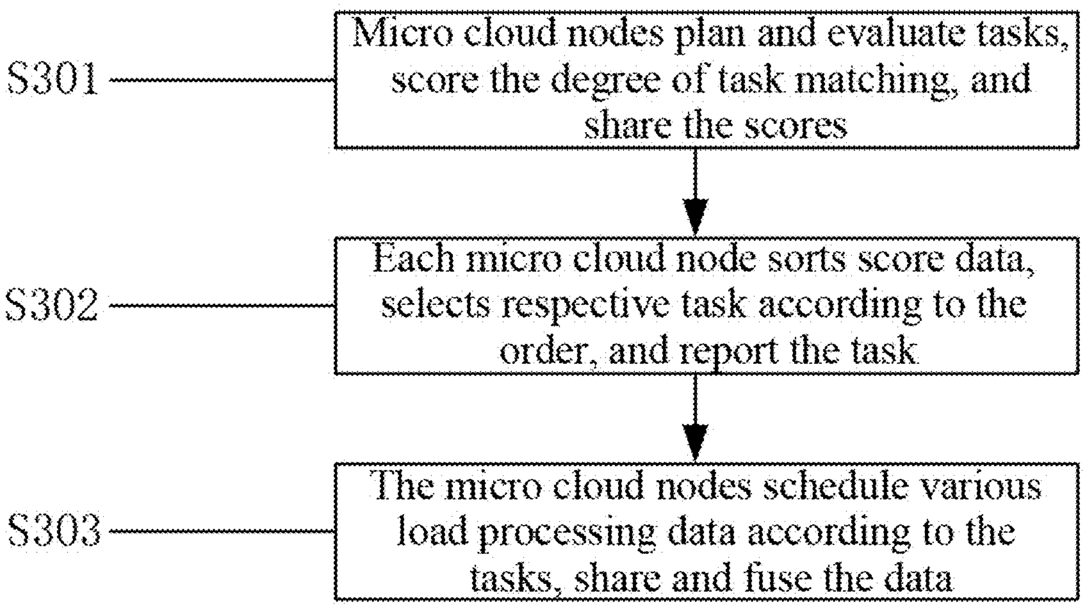
FIG. 3 illustrates a schematic diagram of a relay iteration process for the micro cloud satellite group in the multi-satellite collaborative dynamic micro cloud building method according to the present invention.

As shown in FIG. 3, step S102 of providing on-orbit service support is detailed as follows (S301-S303):

Step S301: Each node in the micro cloud plans and evaluates the current task according to the task instruction and its on-orbit physical resources, scores the degree of task matching according to the evaluation result, and shares the score in the micro cloud.

The planning and evaluation rule is, according to the resource requirements of the task and the remaining resources of satellite nodes, to select nodes that can meet the task requirements and have maximum resource utilization for allocation.

The instruction issued by the task center can be split and allocated to the satellite nodes in the micro cloud for processing. The relative distance and connection relationship of each satellite change dynamically, and the carried computing and storage resources are different. Therefore, different subtasks are allocated according to the characteristics of each satellite in the micro cloud.

The matching score rule is as follows:

$$\text{score\_computing} = \frac{c}{C} * 100\%$$

$$\text{score\_memory} = \frac{s}{S} * 100\%$$

$$\text{score\_total} = \left(\frac{c}{C} + \frac{s}{S}\right) * 100\%$$

If the scores are the same, the storage resource scores, computing resource scores, and distances between satellites are sequentially sorted.

Example: As mentioned above, the image target recognition and processing task issued by the task center is split into three tasks: image pre-processing, feature extraction, and feature matching.

According to the above scoring rule, the scores and order of resources are obtained, as shown in Table 2.

TABLE 2

Scores and order of resources

| Serial number | Satellite ID | CPU computing cores | Storage resources (G) | Computing resource score | Storage resource score | Total score | Order |
|---|---|---|---|---|---|---|---|
| 1 | 32 | 2 | 5 | 10 | 25 | 35 | 4 |
| 2 | 34 | 4 | 6 | 20 | 30 | 50 | 3 |
| 3 | 54 | 2 | 8 | 10 | 40 | 50 | 1 |
| 4 | 43 | 2 | 8 | 10 | 40 | 50 | 2 |

It can be seen that satellites ID54 and ID43 are suitable for the image pre-processing task, ID34 is suitable for feature extraction and feature matching, and satellite ID32 can aggregate the results.

Step S302: Each satellite node in the micro cloud sorts score data, selects a task according to the priority order, and reports the undertaken task.

Step S303: Each node in the micro cloud schedules various load resources according to task allocation, shares load pre-processing data, and processes the same or different load data according to the data shared by other nodes.

Figure 4:
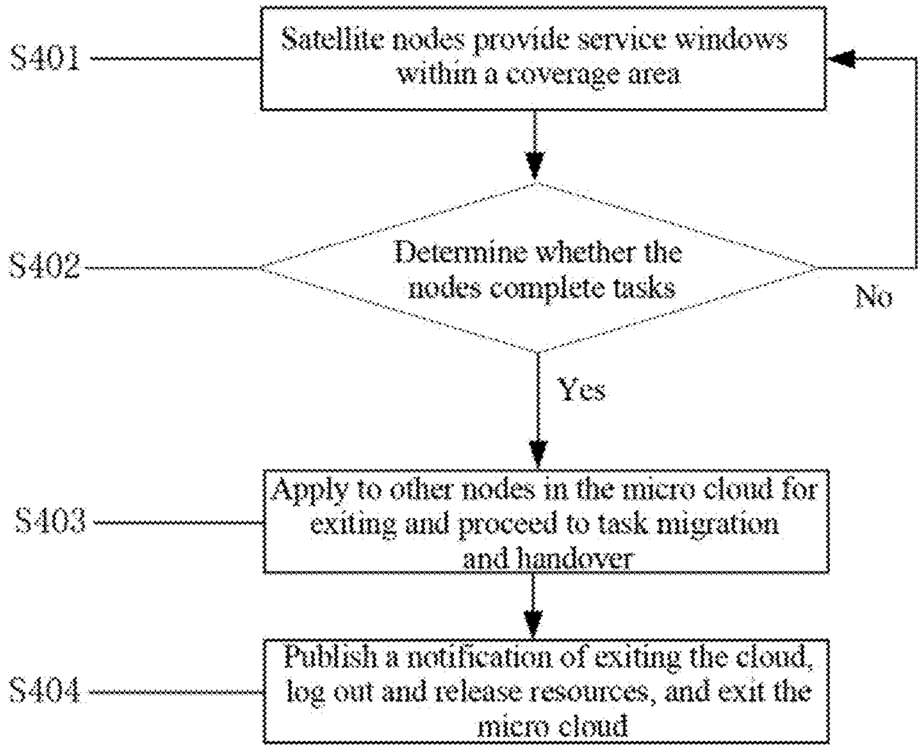
FIG. 4 illustrates a flowchart of a process that micro cloud nodes exit a micro cloud in the multi-satellite collaborative dynamic micro cloud building method according to the present invention.

As shown in FIG. 4, step S103 of micro cloud node update is detailed as follows (S401-S404):

Step S401: The satellite nodes constantly move and provide task service windows within a coverage area.

Service window: The satellite that receives the task is considered as a main node of the micro cloud, and the main node will not change until the micro cloud dissolves. There is a relative movement relationship between other satellite nodes and the main node. When the satellite nodes and the main node are invisible, there is no connection relationship, that is, they exit the service window.

Exit condition: The main node updates the relative distance and visible relationship with other satellite nodes in the micro cloud every 1 minute. If it is detected that a satellite node in the micro cloud is about to exit the service window, a new satellite node needs to be searched for joining.

Task migration and relay: The new satellite node should have better resource conditions than the exiting satellite node, and the task is migrated in a mirror form.

Step S402: Determine whether the allocated task is completed or exits the satellite service window, and whether to exit the micro cloud.

Step S403: If an exit condition is satisfied, apply to other nodes in the micro cloud for exiting and proceed to a task migration and relay handover step. Hand over the task according to the role of the node, and stop task execution.

Step S404: Send a notification of exiting the cloud to other nodes in the micro cloud, log out and release resources, and exit the micro cloud.

In addition, the present invention further provides a distributed micro cloud system. The system is implemented according to the multi-satellite collaborative dynamic micro cloud building method described in the present invention. In the system, a micro cloud satellite group connects devices of different galaxies, and integrates storage and computing resources of the devices together.

The technical advantages of the present invention are as follows:

1. Communication between different satellites, including data transmission, control signal transmission, etc., can be stable.
2. The micro cloud connects devices of different satellite resources, and integrates storage and computing resources of these devices together to form a distributed micro cloud system.
3. The micro cloud system is dynamically built according to the state and available resource information of micro cloud nodes, and the configuration of the micro cloud system can be adaptively adjusted.
4. A dynamic micro cloud building algorithm is designed to dynamically build the micro cloud system according to the state and available resource information of satellite nodes in the micro cloud, and the configuration of the micro cloud system can be adaptively adjusted.
5. The satellite nodes plan and evaluate the current task in conjunction with their on-orbit physical resources, and score the degree of task matching according to the evaluation results to undertake different tasks.
6. Through task transfer relay between satellites, the micro cloud satellite group is dynamically updated to jointly complete task planning and allocation.

Any process or method description in the flowcharts of the present invention or otherwise described herein may be understood as representing a module, fragment, or portion of code including one or more executable instructions for implementing specific logical functions or processes, and can be implemented in any computer-readable medium for instruction execution systems, apparatuses, or devices. The computer-readable medium may include storage, communication, propagation, or transmission programs for use by execution systems, apparatuses, or devices. The computer-readable medium includes a read-only memory, a magnetic disc, an optical disc, or the like.

In the description of this specification, the reference terms "embodiment", "example", etc. indicate that the specific features, structures, materials, or characteristics described in conjunction with the embodiments or examples are included in at least one embodiment or example of the present invention. In this specification, the illustrative expressions of the above terms do not necessarily refer to the same embodiment or example. In addition, those skilled in the art can integrate or combine different embodiments or examples described in this specification and features therein on a non-conflict basis.

Although the above content shows and describes the embodiments of the present invention, it can be understood that the above embodiments are exemplary and cannot be understood as limitations on the present invention. Those of ordinary skill in the art can change, modify, replace, and deform the above embodiments within the scope of the present invention.

Disclosed are a multi-satellite collaborative dynamic micro cloud building method and a distributed micro cloud system. The method includes step S101: triggering to build an initial state of a micro cloud satellite group according to a task instruction; after a satellite node closest to a task center receives the task instruction, each satellite node will perform matching analysis according to its position and existing resource conditions; if the current position of a satellite node meets requirements and carried resources also meet requirements, the satellite node joins the micro cloud satellite group; step S102: beginning task planning and task execution after the satellite nodes join a micro cloud, so as to provide on-orbit service support, where each node joins the micro cloud within a service window, and exits the micro cloud after crossing a mission area service window; and step S103: the micro cloud is a dynamic distributed system, and the satellite nodes join or exit the micro cloud according to service windows and task execution. The multi-satellite collaborative dynamic micro cloud building method and the distributed micro cloud system can provide more reliable and efficient satellite communication services.

We claim:

1. A method for building a multi-satellite collaborative dynamic micro cloud, comprising the following steps:

step (S101): triggering an initial state of building a micro cloud satellite group according to a task instruction; setting a satellite node closest to a task center as a main node, wherein after the main node receives the task instruction, each surrounding satellite node performs matching analysis according to position of the satellite node and existing resource conditions, and if a current position of a satellite node meets requirements and resources carried also meet requirements, the satellite node joins the micro cloud satellite group;

step (S102): beginning task planning and task execution after the satellite nodes join a micro cloud, so as to provide an on-orbit service support, wherein each node joins the micro cloud within a service window, and exits the micro cloud after crossing a mission area service window; and step (S103): joining the satellite nodes in the micro cloud or and exiting the satellite nodes from the micro cloud according to service windows and task execution; wherein the micro cloud is a dynamic distributed system;

wherein step (S101) of building the initial state of the micro cloud satellite group comprises the following steps:

step (S201): publishing a notification of joining the cloud, by the main node, to each satellite node in the micro cloud with a current task as a topic through a distributed publish and subscribe mechanism;

step (S202): subscribing a notification of newly joining satellite nodes by other satellite nodes in the micro cloud, using tasks as topics; storing the notification locally in respective satellite nodes, and publishing handshake information to the newly joining satellite nodes;

step (S203): subscribing, by a new satellite node, the handshake information of the other satellite nodes after publishing a notification of joining the micro cloud; and step (S204): adding a heartbeat mechanism to the management of the micro cloud to periodically monitor whether each satellite node is on line to ensure the management of each satellite node in the micro cloud.

2. The method according to claim 1, wherein in step (S101), parameters for the satellite node relative to the main node comprise: relative distance l, CPU computing cores c, and storage resources s; the task instruction issued by a task center comprises two parts: required computing cores C and storage resources S; considering that the computing content of each task is different and satellites constantly move, a customized micro cloud is built for different tasks;

distances between the main node of the micro cloud and the surrounding satellites are sequentially sorted, and the CPU computing cores c and storage resources s of the satellites are traversed, until the computing cores and storage resources required for tasks meet requirements, said building of the micro cloud is completed; formulas for said building are as follows:

$$\sum_{i=1}^{I} x_{i,j} c_i \geq C$$

$$\sum_{i=1}^{I} x_{i,j} s_i \geq S$$

wherein $x_{i,j}$ represents whether the satellites $i \in I$ belong to the micro cloud $j \in J$, $c_i$ represents CPU computing cores of the satellites $i \in I$, and $s_i$ represents storage resources of the satellites $i \in I$.

3. The method according to claim 1, wherein in step (S201), the notification of joining the cloud comprises satellite node ID, various resource conditions, and load conditions.

4. The method according to claim 3, wherein in step (S202), the publishing of the handshake information is unified by a satellite node in the micro cloud, or the handshake information is published by each satellite node separately.

5. The method according to claim 3, wherein in step (S204), a monitoring period of the heartbeat mechanism is 30 seconds.

6. The method according to claim 1, wherein step (S102) of providing on-orbit service support comprises:

step (S301): planing and evaluating the current task according to the task instruction and on-orbit physical resources for each node in the micro cloud, scoring a degree of task matching according to a evaluation result, and sharing a resulting score in the micro cloud;

step (S302): sorting score data for each node in the micro cloud, selecting a task according to a priority order, and reporting an undertaken task; and step (S303): scheduling various load resources according to a task allocation of each node in the micro cloud, sharing load pre-processing data, and processing the same or different load data according to the data shared by other nodes.

7. The method according to claim 1, wherein step (S103) of updating a node of the micro cloud comprises:

step (S401): providing task service windows within a coverage area as the satellite nodes constantly move;

step (S402): determining whether the task allocated is completed or exits the satellite service window, and determining whether the task allocated exits the micro cloud;

step (S403): applying for exiting from other nodes in the micro cloud if an exit condition is satisfied and proceeding to a task migration and relay handover step; handing over the task according to a role of the node, and stopping task execution; and step (S404): sending a notification of exiting the cloud to other nodes in the micro cloud, logging out and releasing resources, and exiting the micro cloud.

8. A distributed micro cloud system, the system being implemented by the method for building the multi-satellite collaborative dynamic micro cloud according to claim 1, wherein in the system, a micro cloud satellite group connects devices of different galaxies, and integrates storage and computing resources of the devices together.

9. The distributed micro cloud system according to claim 8, wherein the micro cloud system is dynamically built according to the state and available resource information of satellite nodes in a micro cloud, and an configuration of the micro cloud system can be adaptively adjusted.

* * * * *